US012587599B2

(12) United States Patent
Mappus, IV et al.

(10) Patent No.: US 12,587,599 B2
(45) Date of Patent: Mar. 24, 2026

(54) METHOD AND SYSTEM FOR ESTIMATING CALL DURATIONS FOR IMPROVED CALL QUEUE MANAGEMENT

(71) Applicant: JPMorgan Chase Bank, N.A., New York, NY (US)

(72) Inventors: Rudolph L. Mappus, IV, Plano, TX (US); Sri Harsha Pothukuchi, Brambleton, VA (US); Angel Vincent, Milford, OH (US); Peter Kutchen, Bear, DE (US); Owen Churchill, Columbus, OH (US); Jose Burgos, Dallas, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 770 days.

(21) Appl. No.: 17/945,565

(22) Filed: Sep. 15, 2022

(65) Prior Publication Data

US 2024/0098179 A1 Mar. 21, 2024

(51) Int. Cl.
| | |
|---|---|
| *H04M 3/42* | (2006.01) |
| *H04M 3/428* | (2006.01) |
| *H04M 3/436* | (2006.01) |

(52) U.S. Cl.
CPC ....... *H04M 3/42068* (2013.01); *H04M 3/428* (2013.01); *H04M 3/4365* (2013.01)

(58) Field of Classification Search
None
See application file for complete search history.

(56) References Cited

U.S. PATENT DOCUMENTS

| | | | | |
|---|---|---|---|---|
| 6,487,291 | B1 * | 11/2002 | Walker | H04Q 3/64 |
| | | | | 379/88.16 |
| 11,343,377 | B1 * | 5/2022 | Jensen | H04M 3/58 |
| 2017/0111509 | A1 * | 4/2017 | McGann | H04M 3/5238 |
| 2020/0014801 | A1 * | 1/2020 | Mohiuddin | G06Q 10/06393 |
| 2022/0182493 | A1 * | 6/2022 | Ter | H04M 3/5238 |
| 2023/0102179 | A1 * | 3/2023 | Elango | G06N 3/0442 |
| | | | | 704/235 |

* cited by examiner

*Primary Examiner* — Adolf Dsouza
(74) *Attorney, Agent, or Firm* — GREENBLUM & BERNSTEIN, P.L.C.

(57) ABSTRACT

A method for call processing includes: receiving a first incoming telephone call from a first person; retrieving historical information that relates to the first person; forecasting, based on the historical information, a next customer state that relates to the first person; and estimating, based on the forecasted next customer state, a potential duration of the first incoming call. The estimated call duration is then usable for assigning a priority to the first incoming call and determining an order of handling the first incoming call with respect to each of a plurality of other incoming calls based on the assigned priority.

11 Claims, 6 Drawing Sheets

400

Receive Incoming Telephone Call from Customer

S402

Retrieve Historical Information re Customer

S404

Forecast Next Customer State

S406

Estimate Duration of Incoming Telephone Call

S408

Assign Priority to Call

S410

Determine Order of Handling Calls

S412

METHOD AND SYSTEM FOR ESTIMATING CALL DURATIONS FOR IMPROVED CALL QUEUE MANAGEMENT

BACKGROUND

1. Field of the Disclosure

This technology generally relates to methods and systems for handling telephone calls, and more particularly to methods and systems for estimating call durations in order to improve call queue management and efficiency with respect to telephone support systems.

2. Background Information

Customers calling into a customer services telephone support team often face queue wait times. Conventionally, calls are serviced in the order in which they arrive, i.e., first in, first out. When there are more calls than service agents, customers wait for service. Because calls are handled in the order in which they arrive, calls may not be handled efficiently, especially when viewed from the customer's perspective.

Accordingly, there is a need for a method for estimating call durations in order to improve call queue management and efficiency with respect to telephone support systems.

SUMMARY

The present disclosure, through one or more of its various aspects, embodiments, and/or specific features or sub-components, provides, inter alia, various systems, servers, devices, methods, media, programs, and platforms for methods and systems for estimating call durations in order to improve call queue management and efficiency with respect to telephone support systems.

According to an aspect of the present disclosure, a method for handling a telephone call is provided. The method is implemented by at least one processor. The method includes: receiving, by the at least one processor, a first incoming telephone call from a first person; retrieving, by the at least one processor, historical information that relates to the first person; forecasting, by the at least one processor based on the historical information, a next customer state that relates to the first person; and estimating, by the at least one processor based on the forecasted next customer state, a potential duration of the first incoming telephone call.

The method may further include: assigning a priority to the first incoming telephone call based on a result of the estimating; and determining an order of handling the first incoming telephone call with respect to each of a plurality of other incoming telephone calls based on the assigned priority.

The forecasting may include: applying a Hidden Markov Model (HMM) to the historical information; and determining an output of the applying of the HMM as being the next customer state.

The estimating may include: applying a regression model to the output of the applying of the HMM; and determining an output of the applying of the regression model as being the estimated potential duration of the first incoming telephone call.

The regression model may include a Gradient Boosted Machine (GBM) model.

The historical information may include at least one from among transaction-specific information, account-specific information, and call hi story information.

The transaction-specific information may include at least one from among information that relates to making a payment for a particular transaction, information that relates to obtaining an account rewards balance resulting from a completion of the particular transaction, and information that relates to initiating a dispute that relates to the particular transaction.

The account-specific information may include at least one from among information that relates to opening an account, information that relates to changing an address associated with the account, information that relates to requesting a replacement card, information that relates to requesting an account limit increase, information that relates to a dispute report associated with the account, information that relates to a fraud report associated with the account, information that relates to adding an authorized user for the account, information that relates to removing an authorized user for the account, and information that relates to closing the account.

The call history information may include at least one from among a number of calls received from the first person during a predetermined interval, a mean duration of the calls received from the first person during the predetermined interval, and a standard deviation of duration of the calls received from the first individual person during the predetermined time interval.

According to another exemplary embodiment, a computing apparatus for handling a telephone call is provided. The computing apparatus includes a processor; a memory; and a communication interface coupled to each of the processor and the memory. The processor is configured to: receive, via the communication interface, a first incoming telephone call from a first person; retrieve historical information that relates to the first person; forecast, based on the historical information, a next customer state that relates to the first person; and estimate, based on the forecasted next customer state, a potential duration of the first incoming telephone call.

The processor may be further configured to: assign a priority to the first incoming telephone call based on a result of the estimation of the potential duration of the first incoming telephone call; and determine an order of handling the first incoming telephone call with respect to each of a plurality of other incoming telephone calls based on the assigned priority.

The processor may be further configured to: apply a Hidden Markov Model (HMM) to the historical information; and determine an output of the application of the HMM as being the next customer state.

The processor may be further configured to: apply a regression model to the output of the application of the HMM; and determine an output of the application of the regression model as being the estimated potential duration of the first incoming telephone call.

The regression model may include a Gradient Boosted Machine (GBM) model.

The historical information may include at least one from among transaction-specific information, account-specific information, and call history information.

The transaction-specific information may include at least one from among information that relates to making a payment for a particular transaction, information that relates to obtaining an account rewards balance resulting from a completion of the particular transaction, and information that relates to initiating a dispute that relates to the particular transaction.

The account-specific information may include at least one from among information that relates to opening an account, information that relates to changing an address associated with the account, information that relates to requesting a replacement card, information that relates to requesting an account limit increase, information that relates to a dispute report associated with the account, information that relates to a fraud report associated with the account, information that relates to adding an authorized user for the account, information that relates to removing an authorized user for the account, and information that relates to closing the account.

The call history information may include at least one from among a number of calls received from the first person during a predetermined interval, a mean duration of the calls received from the first person during the predetermined interval, and a standard deviation of duration of the calls received from the first individual person during the predetermined time interval.

According to yet another exemplary embodiment, a non-transitory computer readable storage medium storing instructions for handling a telephone call is provided. The storage medium includes executable code which, when executed by a processor, causes the processor to: receive a first incoming telephone call from a first person; retrieve historical information that relates to the first person; forecast, based on the historical information, a next customer state that relates to the first person; and estimate, based on the forecasted next customer state, a potential duration of the first incoming telephone call.

When executed by the processor, the executable code may further cause the processor to: assign a priority to the first incoming telephone call based on a result of the estimation of the potential duration of the first incoming telephone call; and determine an order of handling the first incoming telephone call with respect to each of a plurality of other incoming telephone calls based on the assigned priority.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
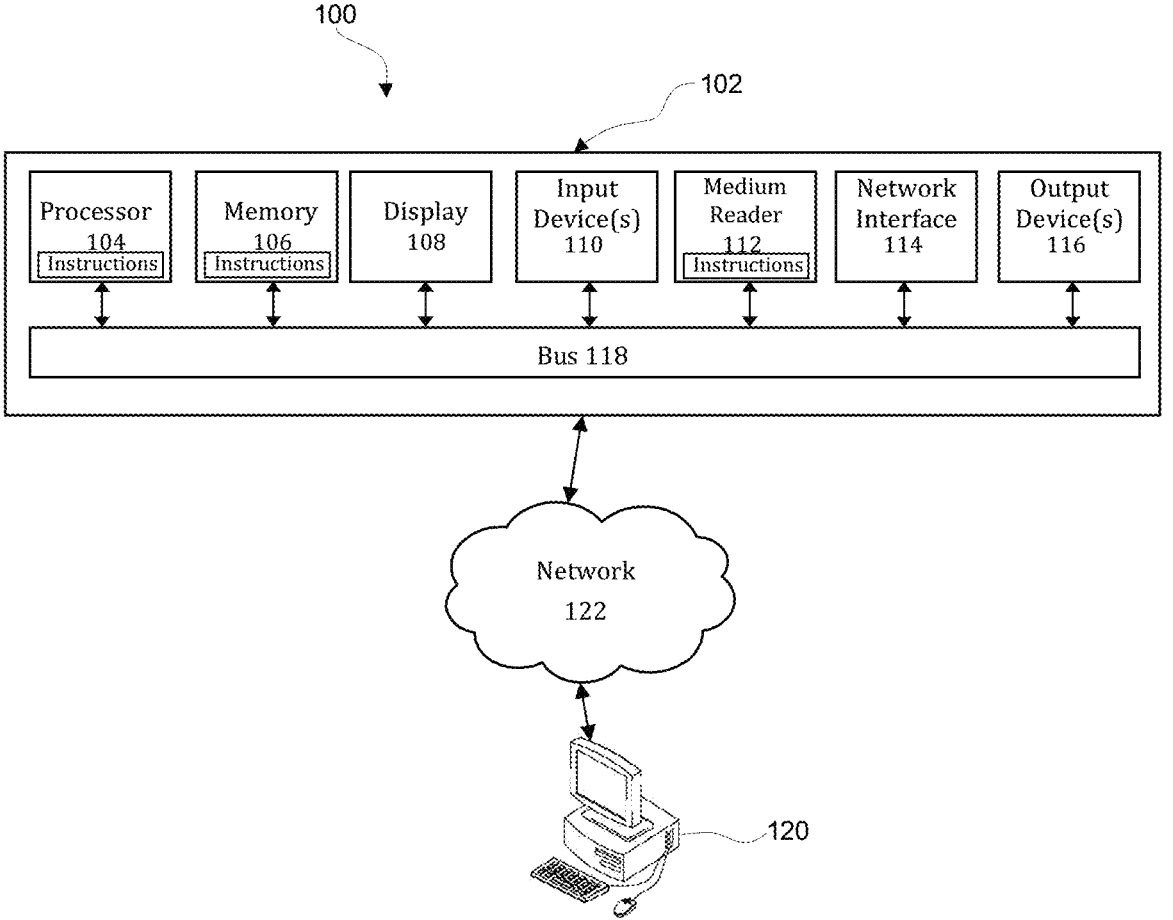
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for estimating call durations in order to improve call queue management and efficiency with respect to telephone support systems.

Figure 2:
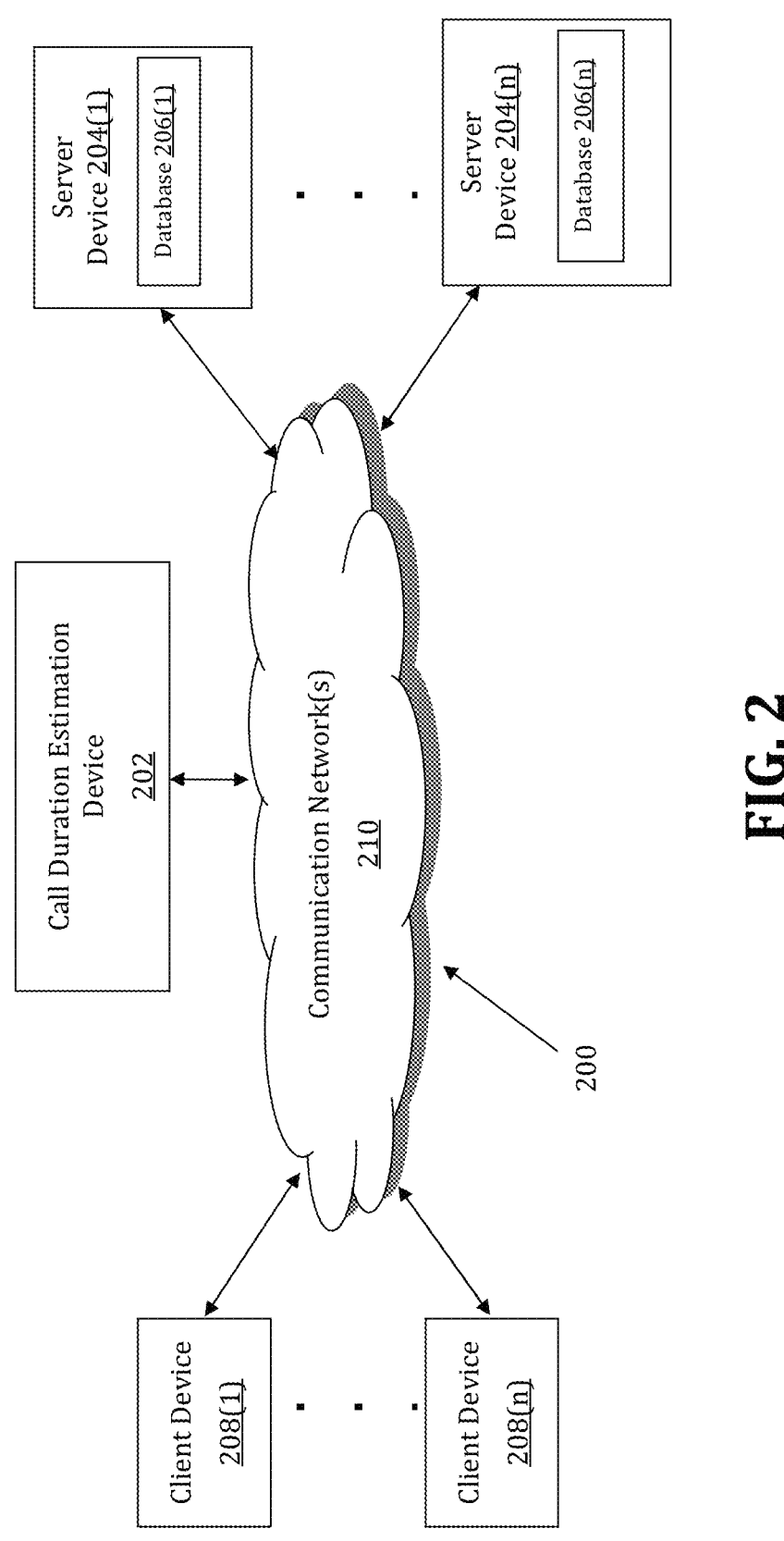
FIG. 2 illustrates an exemplary diagram of a network environment.

Referring to FIG. 2, a schematic of an exemplary network environment 200 for implementing a method for estimating call durations in order to improve call queue management and efficiency with respect to telephone support systems is illustrated. In an exemplary embodiment, the method is executable on any networked computer platform, such as, for example, a personal computer (PC).

The method for estimating call durations in order to improve call queue management and efficiency with respect to telephone support systems may be implemented by a Call Duration Estimation (CDE) device 202. The CDE device 202 may be the same or similar to the computer system 102 as described with respect to FIG. 1. The CDE device 202 may store one or more applications that can include executable instructions that, when executed by the CDE device 202, cause the CDE device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CDE device 202 itself, may be located in virtual server(s) running in a cloud-based computing environment rather than being tied to one or more specific physical network computing devices. Also, the application(s) may be running in one or more virtual machines (VMs) executing on the CDE device 202. Additionally, in one or more embodiments of this technology, virtual machine(s) running on the CDE device 202 may be managed or supervised by a hypervisor.

In the network environment 200 of FIG. 2, the CDE device 202 is coupled to a plurality of server devices 204(1)-204(n) that hosts a plurality of databases 206(1) 206(n), and also to a plurality of client devices 208(1)-208 (n) via communication network(s) 210. A communication interface of the CDE device 202, such as the network interface 114 of the computer system 102 of FIG. 1, operatively couples and communicates between the CDE device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CDE device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and CDE devices that efficiently implement a method for estimating call durations in order to improve call queue management and efficiency with respect to telephone support systems.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CDE device 202 may be a standalone device or integrated with one or more other devices or apparatuses, such as one or more of the server devices 204(1) 204(n), for example. In one particular example, the CDE device 202 may include or be hosted by one of the server devices 204(1)-204(n), and other arrangements are also possible. Moreover, one or more of the devices of the CDE device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204 (n) may include, among other features, one or more processors, a memory, and a communication interface, which are coupled together by a bus or other communication link, although other numbers and/or types of network devices may be used. The server devices 204(1)-204(n) in this example may process requests received from the CDE device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206 (n) that are configured to store data that relates to individual customer accounts and information that relates to customer calls and transactions history.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1) 204(n) are not limited to a particular configuration. Thus, the server devices 204(1) 204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208 (1)-208(n) in this example may include any type of computing device that can interact with the CDE device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the CDE device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the CDE device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CDE device 202, the server devices 204(1)-204(n), or the client devices 208(1) 208(n), for example, may be configured to operate as virtual instances on the same physical machine. In other words, one or more of the CDE device 202, the server devices 204(1)-204(n), or the client devices 208(1)-208(n) may operate on the same physical device rather than as separate devices communicating through communication network(s) 210. Additionally, there may be more or fewer CDE devices 202, server devices 204(1) 204(n), or client devices 208(1)-208 (n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
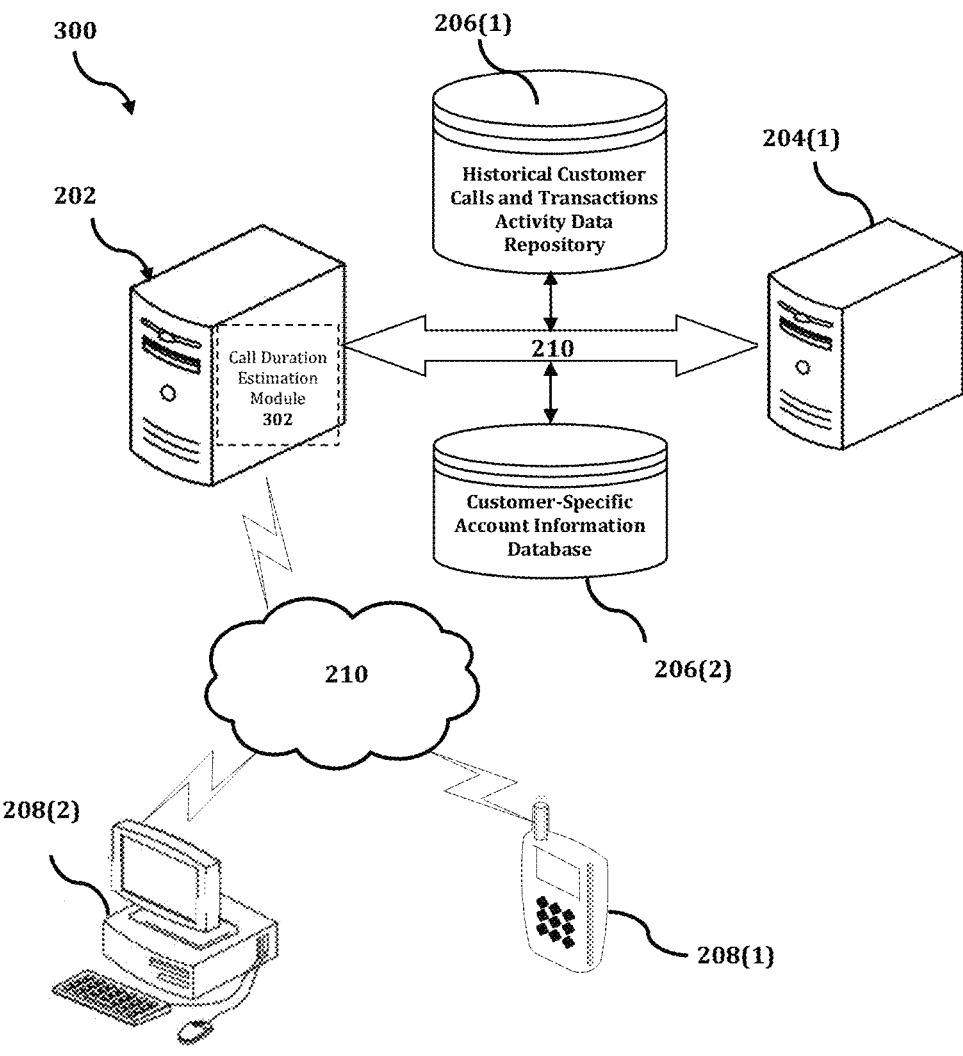
FIG. 3 shows an exemplary system for implementing a method for estimating call durations in order to improve call queue management and efficiency with respect to telephone support systems.

The CDE device 202 is described and illustrated in FIG. 3 as including a call duration estimation module 302, although it may include other rules, policies, modules, databases, or applications, for example. As will be described below, the call duration estimation module 302 is configured to implement a method for estimating call durations in order to improve call queue management and efficiency with respect to telephone support systems.

An exemplary process 300 for implementing a mechanism for estimating call durations in order to improve call queue management and efficiency with respect to telephone support systems by utilizing the network environment of FIG. 2 is illustrated as being executed in FIG. 3. Specifically, a first client device 208(1) and a second client device 208(2) are illustrated as being in communication with CDE device 202. In this regard, the first client device 208(1) and the second client device 208(2) may be "clients" of the CDE device 202 and are described herein as such. Nevertheless, it is to be known and understood that the first client device 208(1) and/or the second client device 208(2) need not necessarily be "clients" of the CDE device 202, or any entity described in association therewith herein. Any additional or alternative relationship may exist between either or both of the first client device 208(1) and the second client device 208(2) and the CDE device 202, or no relationship may exist.

Further, CDE device 202 is illustrated as being able to access a historical customer calls and transactions activity data repository 206(1) and a customer-specific account information database 206(2). The call duration estimation module 302 may be configured to access these databases for implementing a method for estimating call durations in order to improve call queue management and efficiency with respect to telephone support systems.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the CDE device 202 via broadband or cellular communication. Of course, these embodiments are merely exemplary and are not limiting or exhaustive.

Upon being started, the call duration estimation module 302 executes a process for estimating call durations in order to improve call queue management and efficiency with respect to telephone support systems. An exemplary process for estimating call durations in order to improve call queue management and efficiency with respect to telephone support systems is generally indicated at flowchart 400 in FIG. 4.

Figure 4:
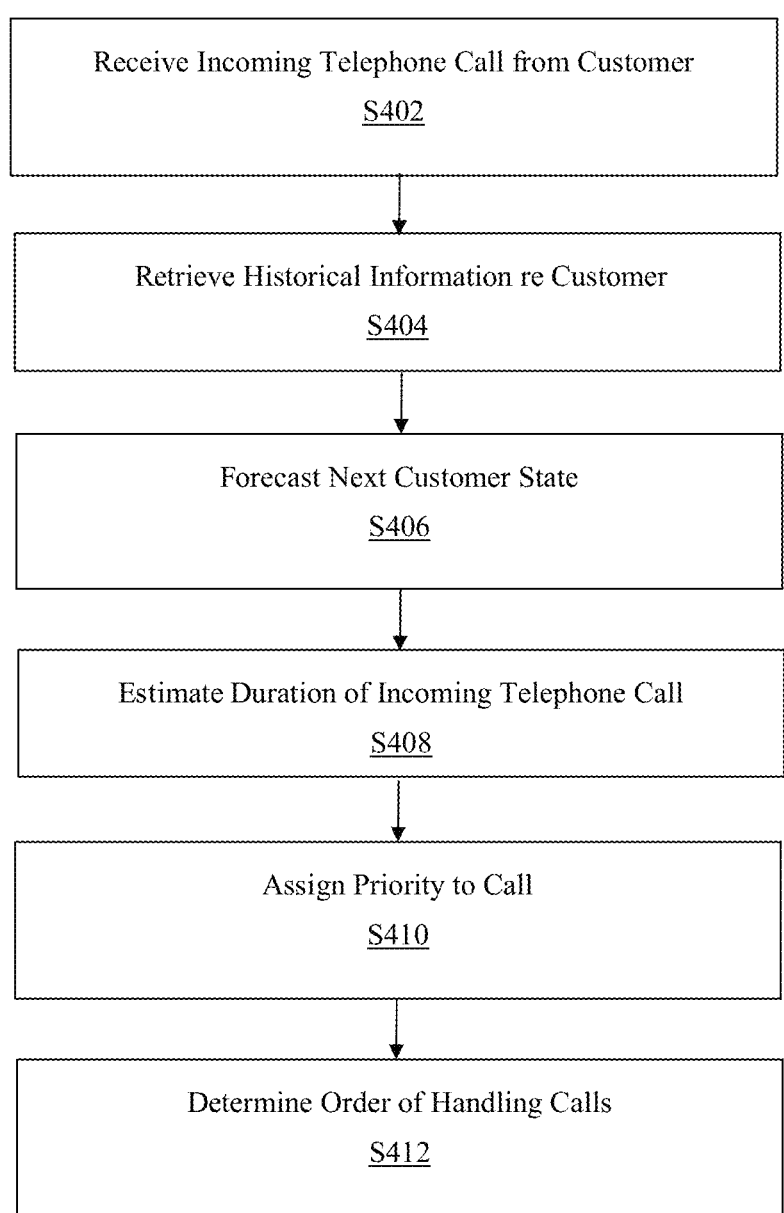
FIG. 4 is a flowchart of an exemplary process for implementing a method for estimating call durations in order to improve call queue management and efficiency with respect to telephone support systems.

In process 400 of FIG. 4, at step S402, the call duration estimation module 302 receives an incoming telephone call from a person, such as, for example a customer. Then, at step S404, the call duration estimation module 302 retrieves historical information that relates to the caller. In an exemplary embodiment, the historical information may include any one or more of transaction-specific information, account-specific information, and call history information.

In an exemplary embodiment, the transaction-specific information includes information about the person's transaction history, such as, for example, information that relates to one or more payments that the person has made in connection with various transactions, information that relates to obtaining an account rewards balance resulting from a completion of a particular transaction, and/or information that relates to initiating a dispute in connection with a particular transaction.

In an exemplary embodiment, the account-specific information includes information about an account that is associated with the person. For example, the account-specific information may include information that relates to opening or closing an account, information that relates to changing an address associated with the account, information that relates to requesting a replacement card for the account, information that relates to requesting an account limit increase, information that relates to a dispute report or a fraud report associated with the account, and/or information that relates to adding or removing an authorized user for the account.

In an exemplary embodiment, the call history information includes information about calls that have previously been received from the person. For example, the call history information may include information about a number of calls that have been received during a predetermined interval, i.e., within the last year, the last 6 months, the last 3 months, the last month, or any other suitable interval of time. As another example, the call history information may include information about a mean duration of the calls received during the predetermined interval and/or information about a standard deviation of the duration of the calls received during the predetermined interval.

At step S406, the call duration estimation module 302 forecasts a next customer state that relates to the caller, based on the historical information retrieved in step S404. In an exemplary embodiment, the term "customer state" refers to a position along a customer journey in which the caller is in the process of conducting. For example, the customer state may include a state of needing to make a payment, a state of needing to know a rewards balance, a state of preparing to dispute a transaction, or any other situation that a customer may be in with respect to the customer's account.

In an exemplary embodiment, the forecasting of the next customer state may be performed by applying a Hidden Markov Model (HMM) to the historical information retrieved in step S404, and then determining an output of the application of the HMM as being the next customer state. The HMM may be trained to estimate the most next likely customer state and the most likely next observable action based on a sequence of historical observable actions. In an exemplary embodiment, the HMM may be trained for each product or service offered by a commercial entity that administers the account associated with the customer.

At step S408, the call duration estimation module 302 estimates a duration of the incoming telephone call, based on the next customer state forecasted in step S406. In an exemplary embodiment, the estimation of the duration of the incoming call may be performed by applying a regression model, such as, for example, a Gradient Boosted Machine (GBM) model, to the output of the HMM.

At step S410, the call duration estimation module 302 assigns a priority to the incoming telephone call based on the result of the duration estimation performed in step S408.

Then, at step S412, the call duration estimation module 302 determines an order of handling the incoming telephone call with respect to other incoming calls, based on the assigned priority. In an exemplary embodiment, when a relatively high priority is assigned to the incoming call, the call duration estimation module 302 may determine that the incoming call is to be handled relatively sooner than most or all other incoming calls; and when a relatively low priority is assigned to the incoming call, the call duration estimation module 302 may determine that the incoming call is to be handled after some number of other incoming calls are handled, i.e., relatively later.

In an exemplary embodiment, a method and a system for estimating call durations in order to improve call queue management and efficiency with respect to telephone support systems is provided. The method and the system estimate call durations for incoming calls and manage call queues using a set of strategies, customer details, and estimated durations.

To inform queue management strategies, the system estimates the duration of incoming calls. For instance, by prioritizing shortest estimated call durations first, average wait times or the overall wait time for customers can be improved. This requires call duration estimates for each call arriving in the queue. The method uses a novel combination of latent state and regression models to estimate durations of new calls.

Estimating customer journey current state: In an exemplary embodiment, the system models customer states using two concepts: latent states and observables. The latent states are the states that customers are in during their respective journeys (e.g., a customer state may be needing to make a payment, needing to know a rewards balance, or needing to dispute a transaction). The state is not observable to the model; the model only sees the observables that are the transactions a customer conducts in connection with an account administered by the firm that is handling the call queue. For example, a customer's observables with their product might include making a payment, obtaining rewards balance, or initiating a dispute. The customer state may be more complicated than the state that is encompassed by an action (e.g., a customer may be seeking information about a product or benefit). In an exemplary embodiment, the system recovers a Hidden Markov Model (HMM) using the historical transaction data from all customers, where the transaction data includes account transactions (i.e., payments and debits) as well as account activity (i.e., open account, address change, replacement card, limit increase, disputes or fraud reports, add/remove authorized user, and/or or account closure) as well as account inquiries (i.e., balance, available funds, rewards). The HMM is capable of estimating the most likely next state and most likely observable given the sequence of historical observables. In the context of customer journey, the HMM recovers the most likely next customer state given the customer's transaction history.

Figure 5:
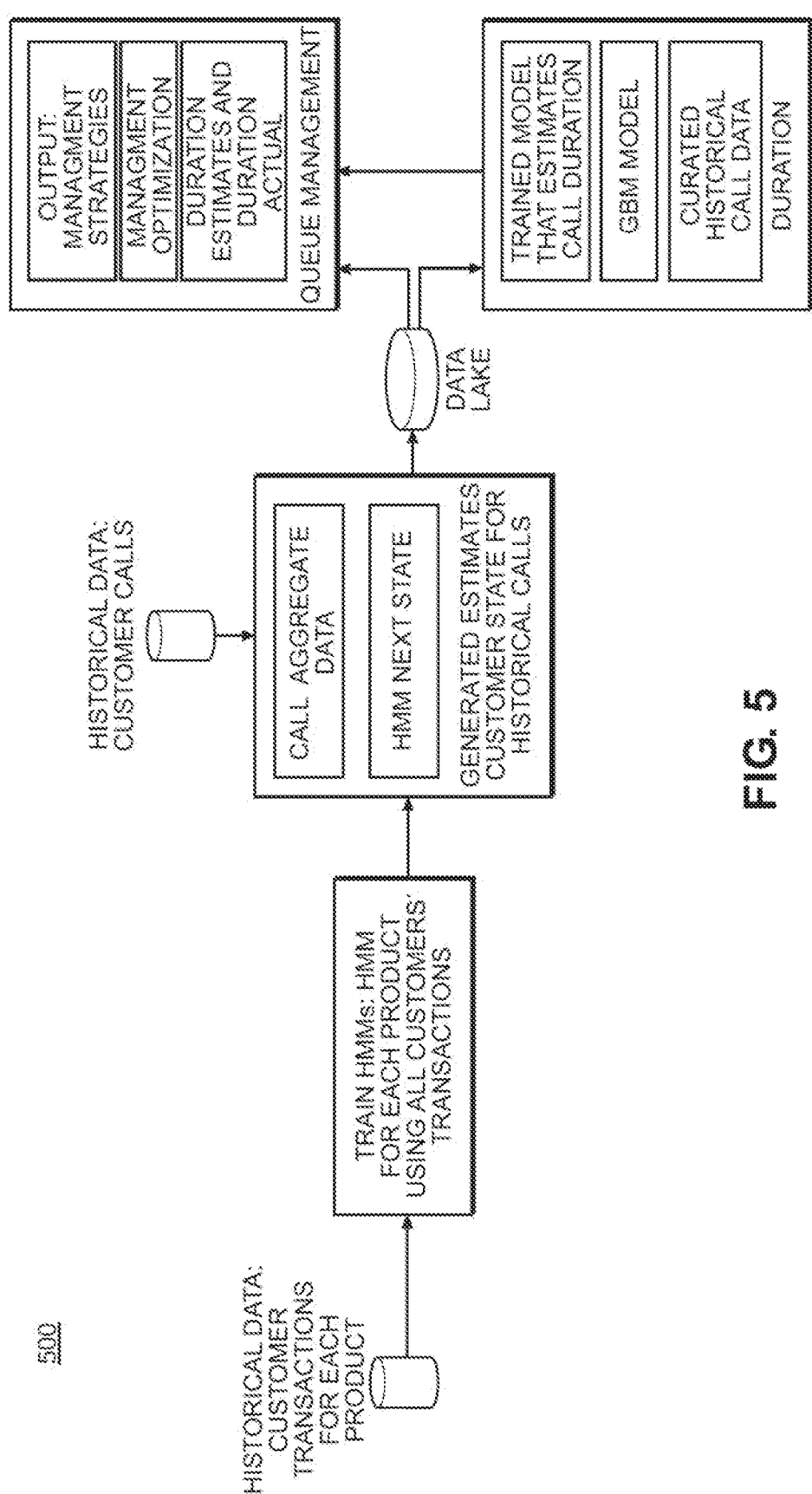
FIG. 5 is a data flow diagram that illustrates a training workflow that occurs in the performance of a method for estimating call durations in order to improve call queue management and efficiency with respect to telephone support systems, according to an exemplary embodiment.

FIG. 5 is a data flow diagram 500 that illustrates a training workflow that occurs in the performance of a method for estimating call durations in order to improve call queue management and efficiency with respect to telephone support systems, according to an exemplary embodiment.

Referring to FIG. 5, in an exemplary embodiment, the method uses the HMM's most likely next observable in historical data, and by collecting the durations and data of customers and the next observable, the method is trained to predict the durations of future calls. The HMM is then used in operation to estimate, for a calling customer, what is that customer's most likely next observable (i.e., transaction). The system trains an HMM for each product or service offered by the firm to customers.

Estimating call duration training: In an exemplary embodiment, the method trains a regression model, such as, for example, a Gradient Boosted Machine regression model, to recover a function that predicts the duration of a new call given the next observable result of the HMM of the customer in the moment plus historical call data for the customer.

Estimating call duration serving: In an exemplary embodiment, the system uses the trained regression model to estimate the call duration for incoming calls. The aim is to recover, from previous call data, a function that estimates a new call's duration based on historical data of call durations. This Gradient Boosted Machine regression model uses historical data to learn a piecewise linear predictive function for estimating the call duration. To learn this, the system collects historical data where call duration is known, along with other details of historical calls, such as, for example: how often the customer calls, the durations of previous calls, overall call durations, the type of calls the customer has placed, the durations of the call types they have made in the past, the number and complexity of products the customer has, and the call durations for those products across all customers. This training loop collects historical data customer and call data, including the call duration, for training and validating a regression model.

| Data Name | Data Type | Description |
| --- | --- | --- |
| Customer_id | String | Unique customer identifier (caller) |
| Cx_next_observable | String | Categorial variable representing the HMM's next most likely observable at the time of this call |
| Cx_prod_cnt | Number | Count of products customer has |
| Cx_mean_prod_complexity | Number | Average complexity of products customer has |
| Cx_calls_cnt_1 yr | Number | Count of calls made over last year from current date |
| Cx_calls_cnt_6 m | Number | Count of calls last 6 months |
| Cx_calls_cnt_120 d | Number | Count of calls last 4 months |
| Cx_calls_cnt_90 d | Number | Count of calls last 3 months |
| Cx_calls_cnt_60 d | Number | Count of calls last 2 months |
| Cx_calls_cnt_30 d | Number | Count of calls last 30 days |
| Cx_mean_dur_1 yr | Number | Mean duration of calls over last year |
| Cx_mean_dur_6 m | Number | Mean duration of calls over last 6 months |
| Cx_mean_dur_120 d | Number | Mean duration of calls over last 4 months |
| Cx_mean_dur_90 d | Number | Mean duration of calls over last 3 months |
| Cx_mean_dur_60 d | Number | Mean duration of calls over last 2 months |
| Cx_mean_dur_30 d | Number | Mean duration of calls over last 30 days |
| Cx_std_dur_1 yr | Number | Standard deviation of calls over last year |
| Cx_std_dur_6 m | Number | Standard deviation of calls over last 6 months |
| Cx_std_dur_120 d | Number | Standard deviation of calls over last 4 months |
| Cx_std_dur_90 d | Number | Standard deviation of calls over last 3 months |
| Cx_std_dur_60 d | Number | Standard deviation of calls over last 2 months |
| Cx_std_dur_30 d | Number | Standard deviation of calls over last 30 days |
| Call_duration_s | Number | Call duration in seconds |

When a new call arrives, the system estimates the current state of the customer's journey for the product. The system then estimates the duration of the call given this customer state and customer history.

Figure 6:
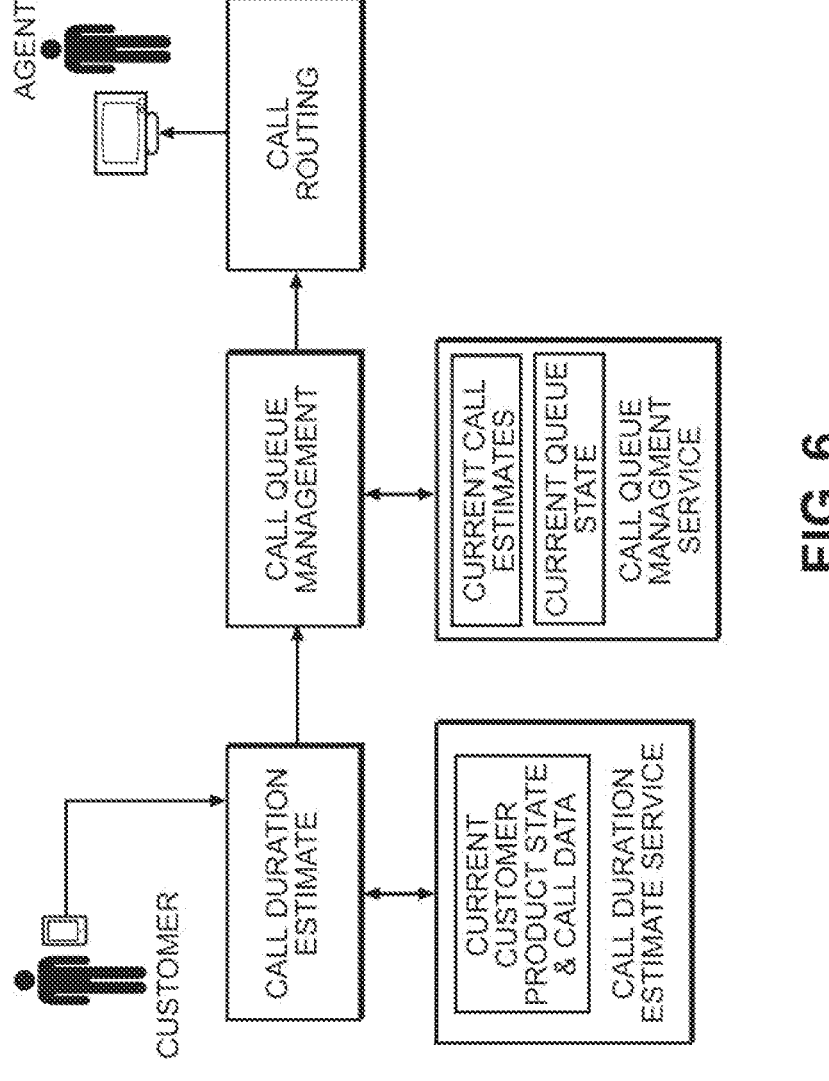
FIG. 6 is a data flow diagram that illustrates a serving workflow that occurs in the performance of a method for estimating call durations in order to improve call queue management and efficiency with respect to telephone support systems, according to an exemplary embodiment.

FIG. 6 is a data flow diagram 600 that illustrates a serving workflow that occurs in the performance of a method for estimating call durations in order to improve call queue management and efficiency with respect to telephone support systems, according to an exemplary embodiment.

Queue management strategies: Referring to FIG. 6, a key benefit to estimating call duration is the ability to manage call queues. The method supports scheduling strategies that use incoming calls estimated duration and metadata, and the system supports switching strategies as calls arrive, in accordance with one or more of the following:

Strategy 1—Shortest calls first (i.e., lowest predicted call duration): Using the estimated duration for each call, this strategy prioritizes the shortest calls first, where longest calls have a time to live in the queue before being prioritized so that all calls are serviced. This strategy directly affects the average wait time in the queue: by giving shorter calls higher priority, more calls are handled in the same the time frame when compared to first-in first-out.

Strategy 2—Striated Randomness: In this scheduling strategy, the current call queue is ordered by estimated duration and calls are grouped into duration striations (e.g. deciles). A random process selects a striation, and calls are selected randomly without replacement from that striation for service. Uniform selection occurs until the queue is exhausted.

Strategy 3—Least Resource Used Strategy (i.e., most valued first): longest expected tenure, highest current value in revenue. In this strategy, the scheduler prioritizes calls based on the customer profile, i.e., a customer that carries products with high complexity is given a higher priority.

In an exemplary embodiment, the method uses historical call data of a given call queue to recommend a strategy that optimizes average wait time and expected recovered value for calls handled. As a result, the ability to predict call volume and call duration allows for better scheduling of call agents to handle anticipated load, and the ability to manage calls queues for throughput lowers the overall costs of queue management.

Accordingly, with this technology, an optimized process for estimating call durations in order to improve call queue management and efficiency with respect to telephone support systems is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for handling a telephone call, the method being implemented by at least one processor, the method comprising:

receiving, by the at least one processor, a first incoming telephone call from a first person;

retrieving, by the at least one processor, historical information that relates to the first person;

forecasting, by the at least one processor based on the historical information, a next customer state that relates to the first person;

estimating, by the at least one processor based on the forecasted next customer state, a potential duration of the first incoming telephone call;

assigning a priority to the first incoming telephone call based on a result of the estimating; and determining an order of handling the first incoming telephone call with respect to each of a plurality of other incoming telephone calls based on the assigned priority, wherein the historical information includes at least one from among transaction-specific information and account-specific information, and wherein the account-specific information includes at least one from among information that relates to changing an address associated with an account, information that relates to requesting a replacement card, information that relates to requesting an account limit increase, information that relates to a dispute report associated with the account, information that relates to a fraud report associated with the account, information that relates to adding an authorized user for the account, information that relates to removing an authorized user for the account, and information that relates to closing the account.

2. The method of claim 1, wherein the forecasting comprises:

applying a Hidden Markov Model (HMM) to the historical information; and determining an output of the applying of the HMM as being the next customer state.

3. The method of claim 2, wherein the estimating comprises:

applying a regression model to the output of the applying of the HMM; and determining an output of the applying of the regression model as being the estimated potential duration of the first incoming telephone call.

4. The method of claim 3, wherein the regression model includes a Gradient Boosted Machine (GBM) model.

5. The method of claim 1, wherein the transaction-specific information includes at least one from among information that relates to obtaining an account rewards balance resulting from a completion of a particular transaction, and information that relates to initiating a dispute that relates to the particular transaction.

6. A computing apparatus for handling a telephone call, the computing apparatus comprising:

a processor;

a memory; and a communication interface coupled to each of the processor and the memory, wherein the processor is configured to:

receive, via the communication interface, a first incoming telephone call from a first person;

retrieve historical information that relates to the first person;

forecast, based on the historical information, a next customer state that relates to the first person;

estimate, based on the forecasted next customer state, a potential duration of the first incoming telephone call;

assign a priority to the first incoming telephone call based on a result of the estimation of the potential duration of the first incoming telephone call; and determine an order of handling the first incoming telephone call with respect to each of a plurality of other incoming telephone calls based on the assigned priority, wherein the historical information includes at least one from among transaction-specific information and account-specific information, and wherein the account-specific information includes at least one from among information that relates to changing an address associated with an account, information that relates to requesting a replacement card, information that relates to requesting an account limit increase, information that relates to a dispute report associated with the account, information that relates to a fraud report associated with the account, information that relates to adding an authorized user for the account, information that relates to removing an authorized user for the account, and information that relates to closing the account.

7. The computing apparatus of claim 6, wherein the processor is further configured to:

apply a Hidden Markov Model (HMM) to the historical information; and determine an output of the application of the HMM as being the next customer state.

8. The computing apparatus of claim 7, wherein the processor is further configured to:

apply a regression model to the output of the application of the HMM; and determine an output of the application of the regression model as being the estimated potential duration of the first incoming telephone call.

9. The computing apparatus of claim 8, wherein the regression model includes a Gradient Boosted Machine (GBM) model.

10. The computing apparatus of claim 6, wherein the transaction-specific information includes at least one from among information that relates to obtaining an account rewards balance resulting from a completion of a particular transaction, and information that relates to initiating a dispute that relates to the particular transaction.

11. A non-transitory computer readable storage medium storing instructions for handling a telephone call, the storage medium comprising executable code which, when executed by a processor, causes the processor to:

receive a first incoming telephone call from a first person;

retrieve historical information that relates to the first person;

forecast, based on the historical information, a next customer state that relates to the first person;

estimate, based on the forecasted next customer state, a potential duration of the first incoming telephone call;

assign a priority to the first incoming telephone call based on a result of the estimation of the potential duration of the first incoming telephone call; and determine an order of handling the first incoming telephone call with respect to each of a plurality of other incoming telephone calls based on the assigned priority, wherein the historical information includes at least one from among transaction-specific information and account-specific information, and wherein the account-specific information includes at least one from among information that relates to changing an address associated with an account, information that relates to requesting a replacement card, information that relates to requesting an account limit increase, information that relates to a dispute report associated with the account, information that relates to a fraud report associated with the account, information that relates to adding an authorized user for the account, information that relates to removing an authorized user for the account, and information that relates to closing the account.

* * * * *